United States Patent

[11] 3,572,513

[72] Inventors Keith W. Tantlinger
 Grosse Pointe Shores;
 Richard T. Fujioka, Oxford, Mich.
[21] Appl. No. 806,231
[22] Filed Mar. 11, 1969
[45] Patented Mar. 30, 1971
[73] Assignee Fruehauf Corporation
 Detroit, Mich.

[54] TROLLEY CRANE APPARATUS
 13 Claims, 7 Drawing Figs.
[52] U.S. Cl. .................................................. 212/10,
 212/17, 212/11, 212/73, 212/74, 214/75
[51] Int. Cl. ...................................................... B66c 17/00
[50] Field of Search .......................................... 212/15, 18,
 10, 17, 20, 21—22, 72—75, 123—128; 104/53, 112;
 214/75 (H)

[56] References Cited
 UNITED STATES PATENTS
 2,778,512 1/1957 Strona ........................... 212/74

| 2,946,460 | 7/1960 | Insolio ........................... | 212/74 |
| 3,006,486 | 10/1961 | Cook ............................. | 214/75(H) |
| 3,482,716 | 12/1969 | Leadley ......................... | 212/74 |
| FOREIGN PATENTS | | | |
| 806,283 | 6/1951 | Germany ....................... | 212/74 |
| 1,122,230 | 1/1962 | Germany ....................... | 212/74 |
| 742,368 | 12/1955 | Great Britain ................. | 212/46 |

Primary Examiner—Harvey C. Hornsby
Attorney—Imirie, Smiley, Snyder & Butrum

ABSTRACT: A generally rectangular support framework is mounted for movement along a pair of fixed spaced parallel tracks. The framework comprises two interconnected portions each of which is of generally U-shaped configuration and includes a long and a short leg, the long leg of one of said framework portions being detachably connected with the short leg of the other of the framework portions. An elongated trolley support is mounted on said support framework for movement laterally with respect thereto. A trolley means is mounted for movement longitudinally along the trolley support.

Patented March 30, 1971

INVENTORS
KEITH W. TANTLINGER &
RICHARD T. FUJIOKA

BY *Bryan and Butrum*

ATTORNEYS

Patented March 30, 1971

INVENTORS
KEITH W. TANTLINGER &
RICHARD T. FUJIOKA

BY Bryan and Bufrum

ATTORNEYS

Patented March 30, 1971

INVENTORS

KEITH W. TANTLINGER &
RICHARD T. FUJIOKA

BY Bryan and Bitrum

ATTORNEYS

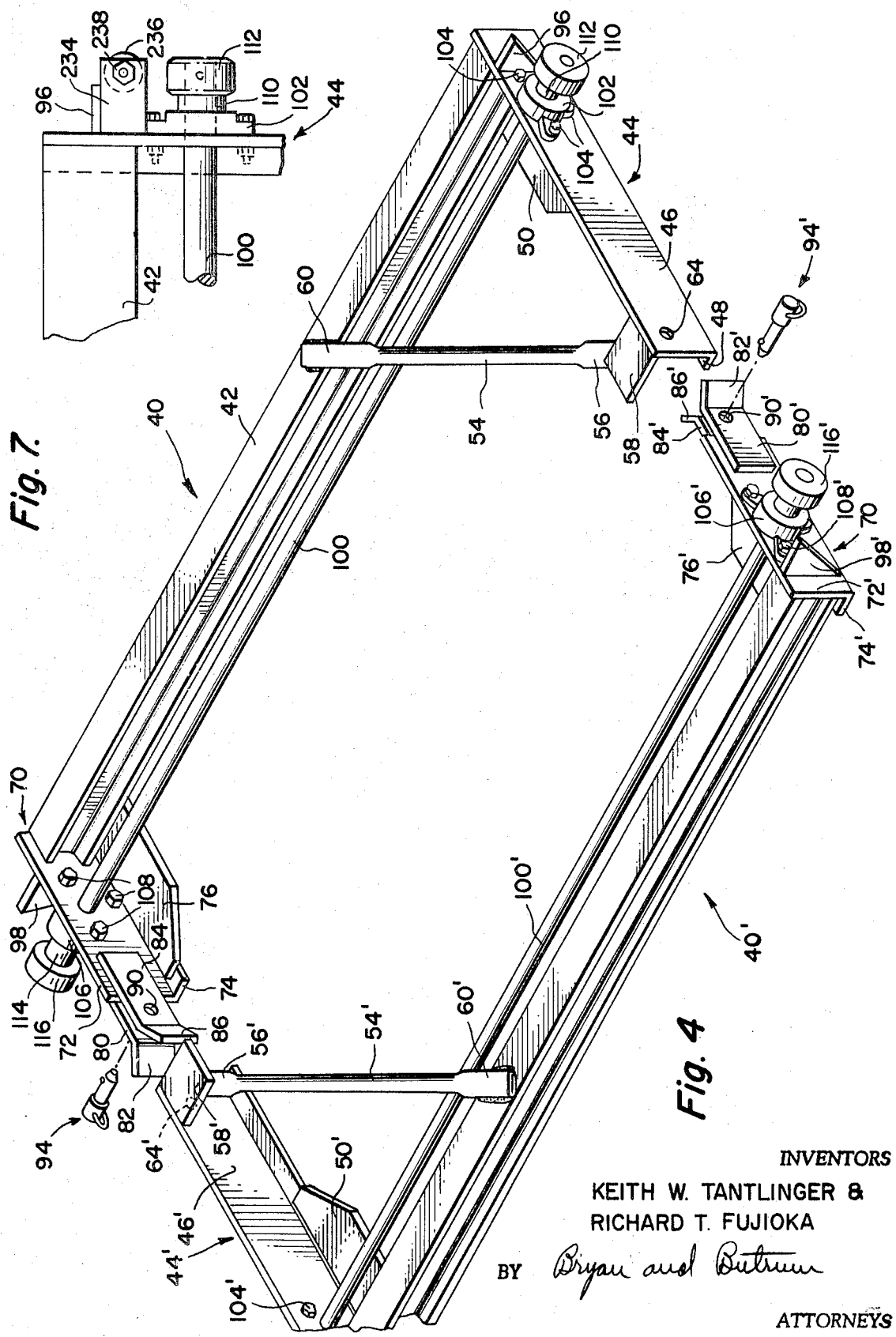

TROLLEY CRANE APPARATUS

BACKGROUND OF THE INVENTION

The present invention relates to a trolley crane which is especially adapted for use with modular sealable shipping containers of the type now in common use for shipping goods on a vehicle frame, railway car or ship and the like. The trolley crane apparatus may also be employed with a conventional trailer or any similar structure wherein there are provided a pair of fixed spaced parallel tracks extending longitudinally of the structure and which are adapted to support a trolley crane for movement with respect thereto.

The trolley crane apparatus is of the type which is adapted to support a load and maneuver the load longitudinally of the associated structure as well as laterally thereof so that the load can be lifted and lowered and properly positioned in or removed from any particular location within the associated structure.

In the prior art, trolley cranes have been associated with trailers and the like and include trolley means which can be moved both longitudinally and transversely with respect to the trailer to handle an associated load as required. The types of trolley cranes now in use are not of such a construction that they can be readily assembled and disassembled for mounting within tracks provided in a shipping container or a trailer.

It is desirable to provide a trolley crane apparatus which can be quickly assembled and disassembled as required whereby the trolley crane can be effectively mounted in operative position within fixed spaced parallel tracks provided in the associated structure, and then subsequently dismounted an removed from the structure when no longer required. Trolley cranes as heretofore employed do not provide a structure which is suitable for such use.

SUMMARY OF THE INVENTION

The present invention provides a trolley crane including a support framework upon which a trolley support is movably mounted for movement laterally of the framework, this trolley support serving to movably support a trolley means movable longitudinally of the apparatus.

The support framework comprises two detachably connected portions including means for supporting them for movement along associated tracks. These two detachable portions of the framework are of similar construction and each is generally U-shaped in configuration including a long leg and a short leg. The long leg of one of the framework portions is interconnected with the short leg of the other of the framework portions in the assembled operative position. Quick connect and disconnect means is provided so that these two portions can be readily connected and disconnected as desired.

An important feature of the present invention is the construction of the framework portions wherein one leg of each framework portion is substantially shorter than the other leg thereof. With this arrangement, each portion of the trolley crane can be positioned adjacent the associated tracks and then swung into operative position relative thereto, whereupon the two framework portions can be connected with one another. The provision of the short leg on each of the support portions enables the support portions to be swung into the desired operative position without the necessity of providing excessive lateral clearance in the tracks provided at the upper portions of the associated structure.

The assembled trolley crane provides a very strong and rigid structure which is adapted to support relatively heavy loads and which can be readily maneuvered into desired position within the associated structure.

BRIEF DESCRIPTION OF THE DRAWINGS

FIG. 4 is a top perspective view partly broken away of the support framework of the crane;

FIG. 7 is a top view of a corner portion of the support framework of a modified form of the invention.

DESCRIPTION OF THE PREFERRED EMBODIMENTS

Figure 1:
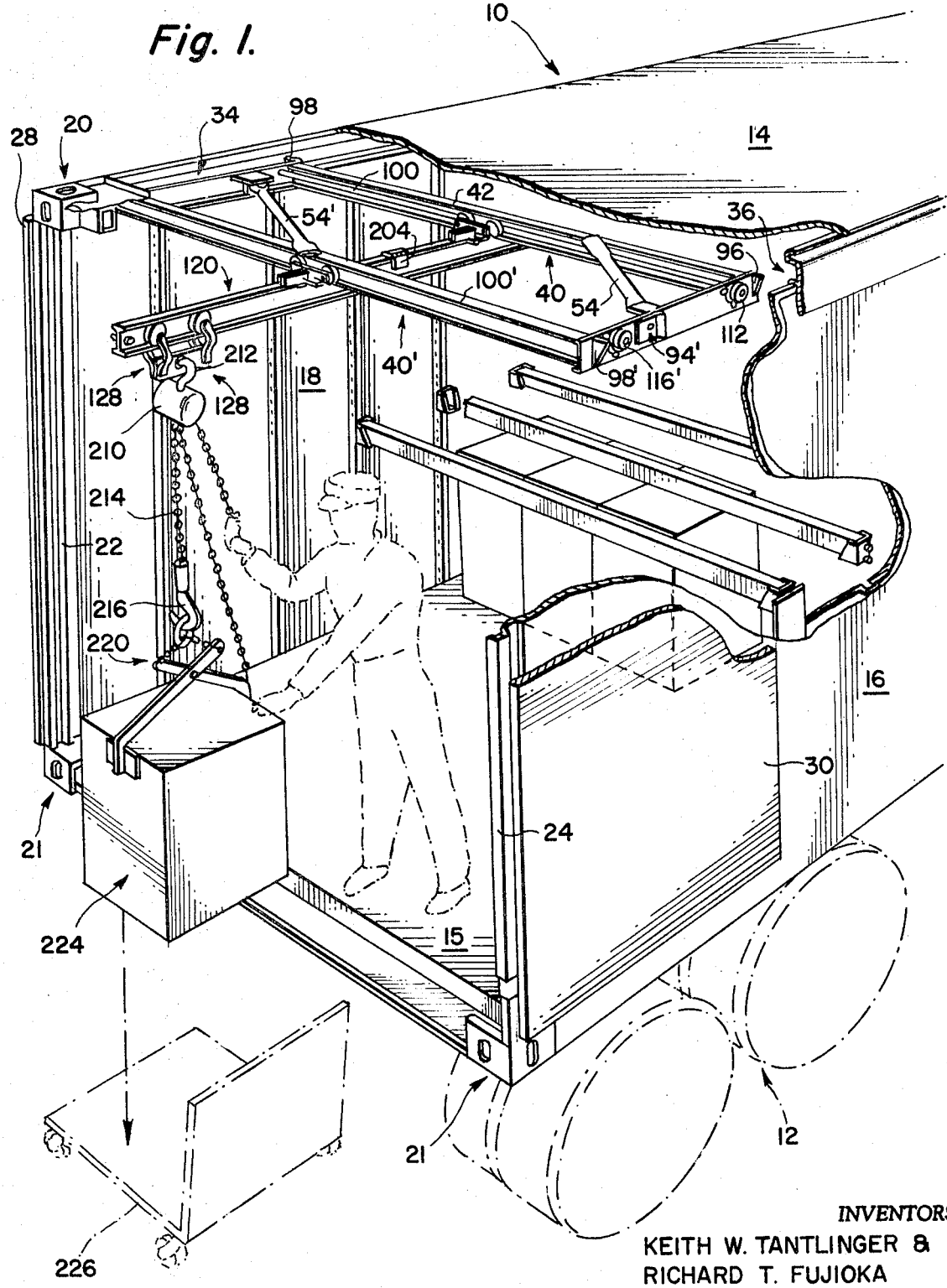
FIG. 1 is a top perspective view partly broken away of the rear end of a shipping container mounted on a flat bed vehicle and having the trolley crane of the present invention supported therewithin.

Referring now to the drawings wherein like reference characters designate corresponding parts throughout the several views, FIG. 1 illustrates a conventional shipping container indicated generally by reference numeral 10 supported upon a suitable flat bed trailer or the like 12. The container includes a top includes a top wall 14 and a floor portion 15 joined by opposite sidewalls 16 and 18 to define a closed chamber within the container.

The end of the container opposite that illustrated is closed, and the openable end of the container includes a pair of upper corner castings 20, one of which is illustrated, and a pair of lower corner castings 21 are disposed at the lower rear corners of the container. A pair of corner posts 22 and 24 define the vertical edges of the rear end of the container. A pair of doors 28 and 30 are suitably swingably supported by the corner posts so as to selectively open and close the container as desired.

A pair of channel members 34 and 36 extend longitudinally along the upper edges of the interior of the container, these channel members opening laterally into the container and defining tracks for supporting the trolley crane. The tracks defined by these channel members are accordingly disposed in fixed spaced parallel relationship with one another and extend substantially throughout the length of the container. Due to the provision of the upper corner castings 20 at the rear end of the container, these tracks do not open through the rear edges of the container, an accordingly, in order to place a trolley crane in operative position within the tracks, it is necessary to swing the trolley crane into the operative position illustrated since it is not possible to slide a trolley crane into an open end of the tracks.

Figure 2:
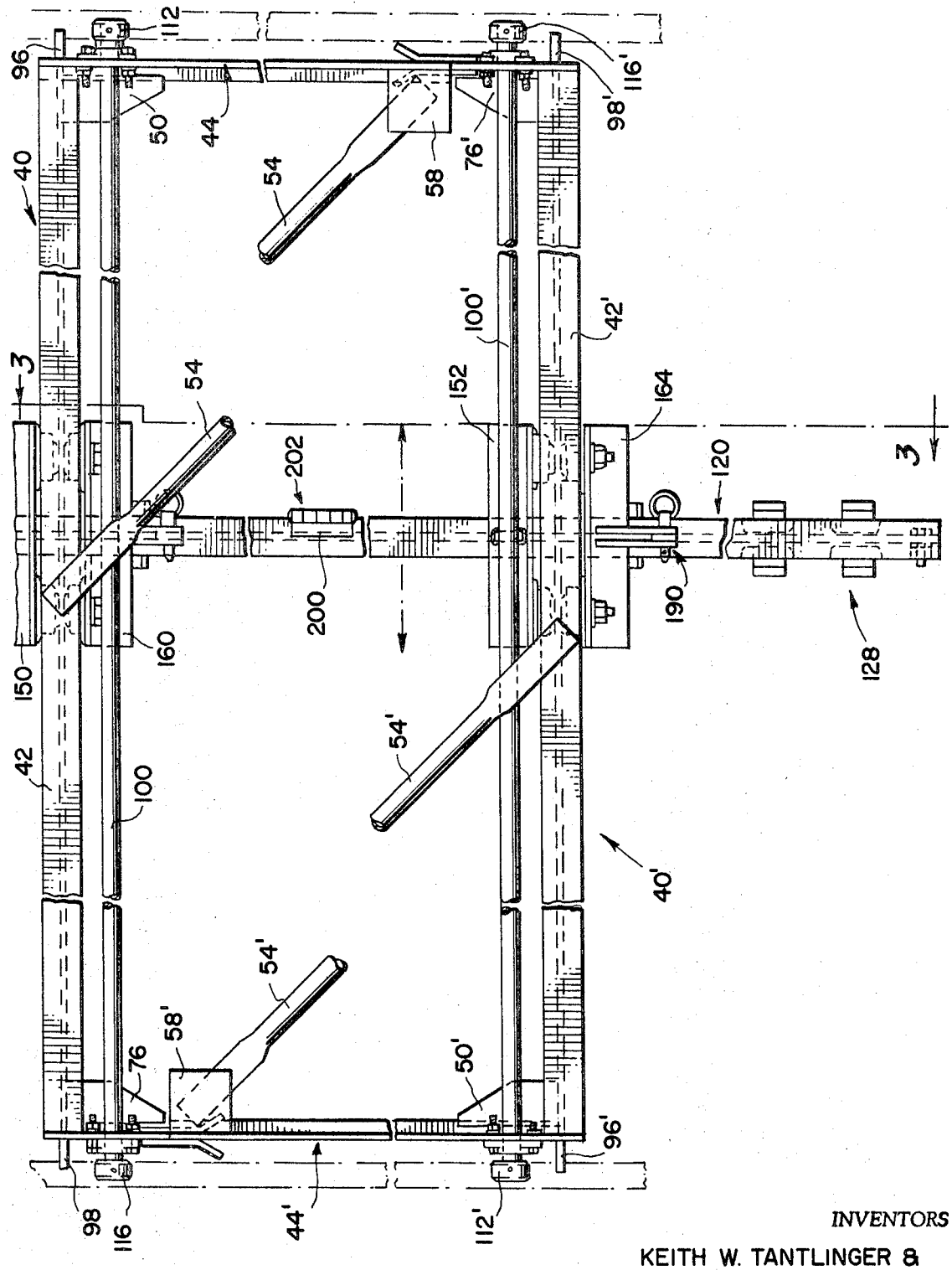
FIG. 2 is a top view of the trolley crane apparatus of the present invention.

Referring now to FIGS. 2 and 4, the details of construction of the support framework are illustrated. The assembled support framework is generally rectangular in configuration as seen in FIG. 2 and includes a pair of substantially identical framework portions 40 and 40' which are adapted to be detachably interconnected with one another. The framework portion 40 will be specifically described, it being understood that framework portion 40' is identical with portion 40, and the reference numerals applied to the components of the framework portion 40 are given the same reference numerals primed in connection with framework portion 40'.

Framework portion 40 includes a transverse I beam member 42 which is rigidly interconnected at one end thereof as by welding with a side member 44 comprising an angle member including a vertical leg portion 46 and a horizontal leg portion 48. A gusset plate 50 is interposed between the undersurface of I beam 42 and the upper surface of the horizontal leg portion 48 and is fixed in place as by welding to provide a rigidified structure. It should be understood that the various components of the structure are formed of a suitable rigid material in order to support a relatively heavy load. In a typical example, the components may be formed of steel, and in some cases the components may also be formed of a lighter metallic substance such as aluminum or the like.

A cross brace member 54 comprises a tube formed of steel or the like with a first flattened end 56 which is secured as by welding to the undersurface of a plate 58 extending inwardly from the vertical leg 46 of side member 44. The opposite end of the cross brace member includes a flattened end 60 which is suitably secured as by welding to the upper surface of transverse member 42.

A hole 64 is formed through side member 44 to cooperate with holes formed in the adjacent leg of the cooperating framework portion 40' as hereinafter described whereby the two framework portions can be readily connected and disconnected with respect to one another.

The opposite end of transverse member 42 is rigidly secured to a side member 70 which may also comprise an angle member including a vertical leg 72 and a horizontal leg 74. A gusset plate 76 is interposed between the undersurface of transverse member 42 and the upper surface of the horizontal leg 74 of side member 70, this gusset plate being rigidly secured in the operative position illustrated.

A first clip member 80 is rigidly secured to the outer surface of the vertical leg 72 of the side member, the outer end 82 of clip member 80 extending outwardly at an angle to the main portion of the clip member. A similar clip member 84 is rigidly secured to the opposite face of the vertical leg 72 of the side member, and the outer end 86 of clip member 84 extends inwardly at an angle thereto whereby the two end portions 82 and 86 define a flared mouth for receiving a part of the opposite framework portion.

The two clip members 80 and 84 define a clip means for receiving the vertical leg 46' of the side member 44' of framework portion 40'. A pair of aligned holes 90 one of which is visible in FIG. 4 are formed through clip members 80 and 84, these holes being adapted to be aligned with a hole 64' formed in the vertical leg 46'; and a conventional ball lock pin 94 is inserted through these aligned holes for holding the two framework portions in connected relationship.

It is accordingly apparent that each framework portion includes a long leg defined by side member 44 and a short leg defined by side member 70 and the clip members 80 and 84. The long leg of each of these generally U-shaped framework portions is substantially longer than the short leg and may be on the order of three or four times the length thereof. Actually, it is desirable to provide a short leg of minimum length longitudinally of the apparatus to facilitate swinging of the framework portions into operative relationship with respect to tracks in the associated structure.

A pair of generally triangular shaped stop lugs 96 and 98 are rigidly secured to the outwardly facing surfaces of side members 44 and 70 respectively, these stop lugs extending laterally of the side members and being adapted to cooperate with suitable means on the associated tracks for limiting movement of the trolley crane with respect to the associated tracks.

An elongated shaft 100 extends through suitable holes provided in the side members 44 and 70, these holes being of a sufficient dimension to permit rotation of the shaft with respect to the side members. One end of the shaft extends through a bearing 102 secured to the outer surface of side member 44 by a plurality of nut and bolt assemblies 104. The opposite end of the shaft is rotatably journaled within a bearing 106 secured to the outer surface of side member 70 by a plurality of nut and bolt assemblies 108.

A first bearing collar 110 is locked on shaft 100 outwardly of bearing 102, and a wheel 112 is secured to the outer end of the shaft by a roll pin or the like. A similar bearing collar 114 is locked to the opposite end of shaft 100 outwardly of the bearing 106, and a wheel 116 is secured to the outer end of shaft 100 by a roll pin or the like.

FIG. 2 illustrates the two portions of the support framework in assembled relationship with respect to one another wherein the short leg of each framework portion is detachably interconnected with the long leg of the other framework portion to define a generally rectangular overall configuration.

As seen most clearly in FIGS. 3—6, the trolley support of the present invention includes a longitudinally extending I beam member 120. Nut and bolt assemblies 122 and 124 extend through suitable holes provided in the web portion of the I beam, these nut and bolt assemblies serving as stop means at the opposite ends of the I beam for limiting movement of the trolley means hereinafter described with respect to the I beam.

The trolley means is indicated generally by reference numeral 128 and includes a flat vertically extending plate 130 having a hole 132 formed therethrough. A first pair of straps 134 are provided at opposite sides of plate 130 at one end thereof and are held in place by nut and bolt assemblies 136. Rollers 138 are carried at the upper ends of straps 134, these rollers being disposed at opposite sides of the central web of I beam 120 and resting on the upper surface of the lower flange thereof.

A further pair of straps 140 are provided at opposite sides of flat plate 130 and are secured thereto by nut and bolt assemblies 142. Wheels 144 are carried at the upper end of straps 140 and are aligned with wheels 138 so as to ride on the bottom flange of the I beam at opposite sides of the central web thereof. The wheels 138 and 144 support the trolley means for movement longitudinally of the apparatus along the trolley support.

The trolley support is supported on the framework for movement laterally with respect thereto. The means for supporting the trolley support on the framework includes a pair of angle members 150 and 152 which are rigidly attached to the upper surface of I beam member 120 at spaced points longitudinally therealong. These angle members carry spaced wheels 154 and 156 which are adapted to ride on the bottom flange of the I beam members 42 and 42' respectively at one side of the central web thereof.

A second pair of angle members 160 and 164 carry spaced wheels 162 and 166 respectively, these latter wheels being adapted to ride upon the bottom flange of the support framework members 42 and 42' respectively at the opposite sides of the central webs thereof from the wheels previously described.

Figure 5:
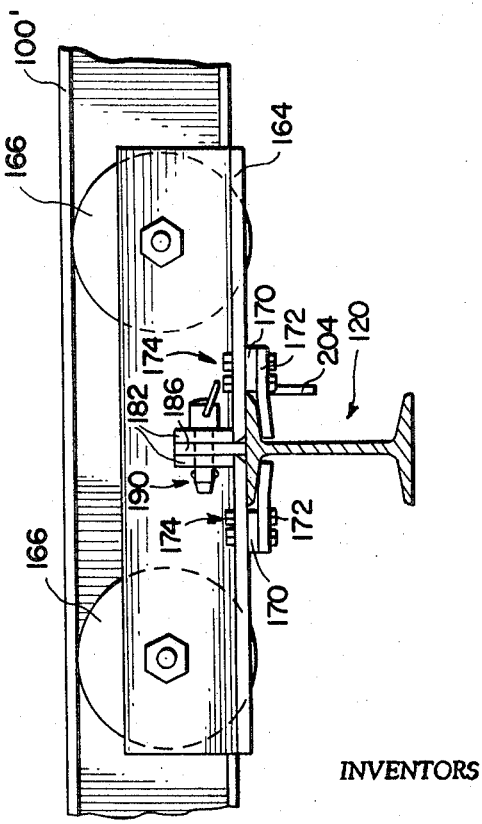
FIG. 5 is a sectional view partly broken away on an enlarged scale taken substantially along line 5—5 of FIG. 3 looking in the direction of the arrows.

As seen most clearly in FIG. 5, a pair of spacer members 170 are disposed in abutting relationship with the undersurface of angle member 164. A pair of plates 172 are in abutting relationship with the undersurface of spacers 170, these plates 172 extending toward one another so as to fit under the upper flange of the I beam 120 as illustrated. The spacers 170 and plates 172 are secured to angle member 164 by a plurality of nut and bolt assemblies 174 extending through suitable aligned holes provided in these members. Angle member 160 is provided with similar spacers and plates, similar components being given the same reference numerals primed as seen in FIG. 3.

A pair of spaced plates 180 are rigidly secured to angle member 160 and extended longitudinally thereof. A similar pair of plates 182 are rigidly secured to angle member 164 and extend longitudinally thereof. A pair of spaced lugs 184 and 186 are rigidly attached to the upper surface of I beam member 120, these lugs being received between the pairs of plates 180 and 182 respectively.

Figure 6:
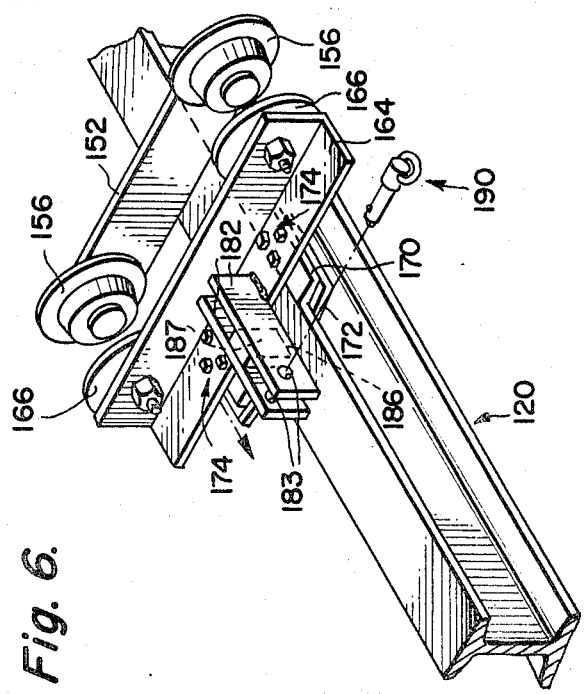
FIG. 6 is a top perspective view partly broken away illustrating the manner of assembly of certain portions of the trolley support.

As seen most clearly in FIG. 6, spaced plates 182 have aligned holes 183 formed therethrough, and lug 186 has a hole 187 formed therethrough which is adapted to be aligned with the holes 183. When these holes are suitably aligned with one another, a conventional ball lock pin 190 is inserted through the aligned holes to retain the components in the assembled relationship shown in FIG. 3. A similar ball lock pin 192 is inserted through corresponding aligned holes provided in the plates 180 and lug 184.

Figure 3:
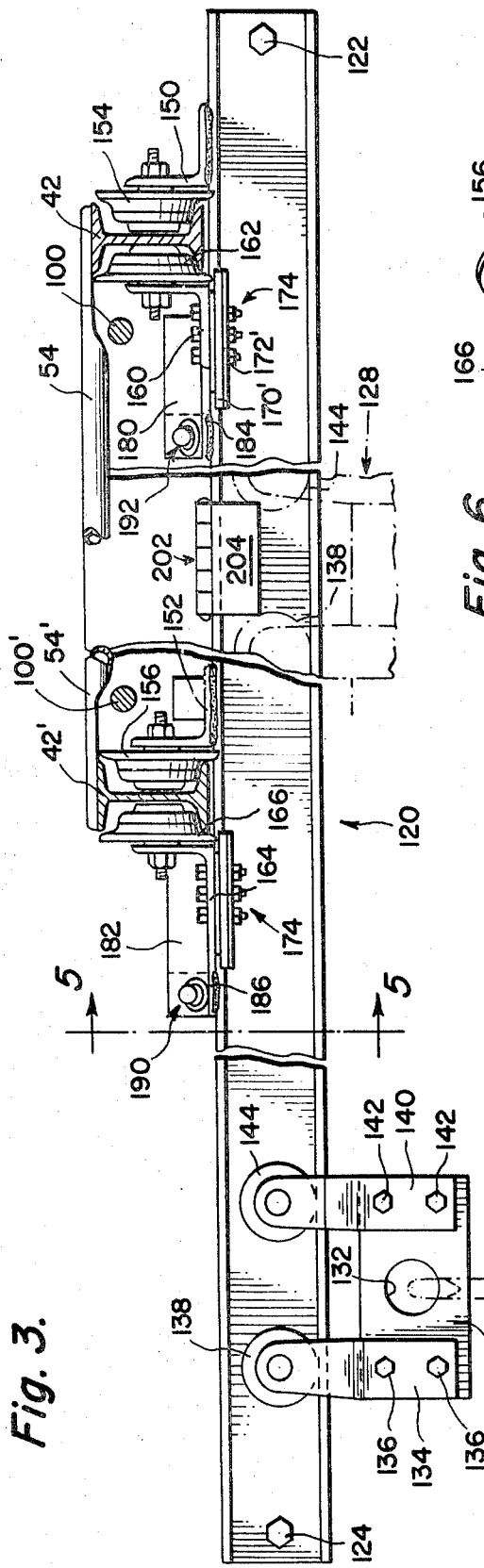
FIG. 3 is a sectional view partly broken away on an enlarged scale taken substantially along line 3—3 of FIG. 2 looking in the direction of the arrows.

It is apparent that when the components are in the operative relationship shown in FIG. 3, the wheels 154, 156, 162 and 166 will serve to support the trolley support I-Beam for lateral movement with respect to the support framework. At the same time, trolley means 128 is freely movable longitudinally along the trolley support.

As seen most clearly in FIG. 2, a plate 200 is rigidly secured to the upper surface of I-Beam member 120 and is connected by a hinge 202 with a plate 204 which is seen most clearly in FIG. 3. This plate 204 serves as a trolley lock means when disposed in the downward position shown in FIG. 3. In this position, the plate 204 is adapted to fit between the rollers 138 and 144 of the trolley as indicated in phantom lines in this FIG. thereby locking the trolley means against longitudinal movement with respect to the trolley support.

This trolley lock means is employed for holding the trolley means at a point on the trolley support disposed substantially midway between the two transverse members 100 and 100' of the support framework. Accordingly, when a load is supported on the trolley means, the load may be moved into this position and then locked in such position so as to provide a uniform distribution of the load on the two framework portions.

As shown in FIG. 1, a conventional hoist 210 is provided with a hook 212 which fits through the hole provided in the vertical plate of the trolley means. A chain 214 associated with the hoist is provided with a hook 216 at the lower end thereof which is connected with a conventional tong mechanism adapted to clamp a load 224 so that the load can be lifted or lowered.

As illustrated in FIG. 1, the load 224 is being lowered onto a dolly 226 by means of the chain hoist. It is apparent that the trolley crane apparatus of the present invention enables a load to be readily maneuvered both longitudinally and laterally with respect to the associated structure.

Referring now to FIG. 7 of the drawings, a modification of the invention is illustrated. A part of a framework portion 40 identical with that previously described is illustrated. The only difference in this form of the invention is that an additional lateral guide means is provided in the form of a laterally extending plate 234 having a roller 236 supported therebeneath by a nut and bolt assembly 238. This roller is adapted to engage the outer lateral surface of the associated track to guide and center the framework during longitudinal movement thereof along the track means. It will be understood that similar guide rollers are provided at opposite sides of the framework so as to properly guide the framework during such longitudinal movement.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Trolley crane apparatus for use with a pair of spaced tracks and comprising a generally rectangular support framework, trolley means movably supported by said framework, said framework including two separate detachably connected portions, means for supporting said portions for movement along a pair of associated tracks, each of said portions of the framework being of generally U-shaped configuration and including a short leg and an opposite long leg which is substantially longer than said short leg so that said two separate portions of the framework can be swung into the confines of two spaced tracks while minimizing the lateral clearance required in the tracks to enable the portions of the framework to be swung into and out of operative position relative to the tracks.

2. Apparatus as defined in claim 1 including quick connect and disconnect means for detachably interconnecting said portions of the framework.

3. Apparatus as defined in claim 1 wherein each of said frame portions includes a transverse I-Beam member interconnected at opposite ends thereof with angle members extending longitudinally of the apparatus.

4. Apparatus as defined in claim 3 wherein each of said detachably connected portions of the framework includes a cross brace member connected between said transverse I-Beam member and one of said angle members.

5. Apparatus as defined in claim 1 including stop lug means carried by said support framework for limiting movement of the framework with respect to associated tracks.

6. Apparatus as defined in claim 1 wherein said framework includes laterally extending guide means for guiding movement of the framework along associated tracks.

7. Apparatus as defined in claim 1 including a trolley support extending longitudinally of the apparatus and being supported by said framework for movement relative thereto, said trolley means being supported for movement along said trolley support.

8. Apparatus as defined in claim 7 wherein said trolley support includes an I-Beam member, antifriction means carried by said I-Beam and movable along parts of each of said two portions of the framework whereby the trolley support is movable laterally of the framework.

9. Apparatus as defined in claim 7 including stop means at opposite ends of said trolley support for limiting movement of said trolley means with respect to said trolley support.

10. Apparatus as defined in claim 7 including trolley lock means on said trolley support for cooperating with said trolley means to lock the trolley means in a predetermined position with respect to said trolley support.

11. Apparatus as defined in claim 10 wherein said trolley lock means is swingably supported on said trolley support.

12. Apparatus as defined in claim 7 wherein said trolley means is provided with antifriction means engaging said trolley support for providing free movement of said trolley means longitudinally along said trolley support.

13. Apparatus as defined in claim 1 wherein each of said detachably connected portions of said support framework is of generally U-shaped configuration, each of said portions having a long leg and a short leg, the long leg of one of said portions being interconnected with the short leg of the other of said portions, a trolley support supported by said framework for movement laterally with respect thereto, said trolley support extending longitudinally of the apparatus, and trolley means supported by said trolley support and movable therealong longitudinally of the apparatus.